US012688303B2

(12) United States Patent
Suryanarayana et al.

(10) Patent No.: US 12,688,303 B2
(45) Date of Patent: Jul. 21, 2026

(54) PROCESSOR ENVIRONMENT AGNOSTIC INFORMATION HANDLING SYSTEM FIRMWARE FORENSIC VULNERABILITY ACCELERATION OPERATION

(71) Applicant: Dell Products L.P., Round Rock, TX (US)

(72) Inventors: Shekar Babu Suryanarayana, Bangalore (IN); Karunakar Poosapalli, Telangana (IN); Siddhartha Bose, Jabalpur (IN)

(73) Assignee: Dell Products L.P., Round Rock, TX (US)

( * ) Notice: Subject to any disclaimer, the term of this patent is extended or adjusted under 35 U.S.C. 154(b) by 63 days.

(21) Appl. No.: 18/643,527

(22) Filed: Apr. 23, 2024

(65) Prior Publication Data

US 2025/0328654 A1     Oct. 23, 2025

(51) Int. Cl.
*G06F 21/57* (2013.01)

(52) U.S. Cl.
CPC .......... *G06F 21/577* (2013.01); *G06F 21/572* (2013.01)

(58) Field of Classification Search
CPC ............................. G06F 21/572; G06F 21/577
See application file for complete search history.

(56) References Cited

U.S. PATENT DOCUMENTS

| | | | | |
|---|---|---|---|---|
| 9,785,492 | B1 * | 10/2017 | Neumann | ........... G06F 11/0712 |
| 10,891,366 | B1 * | 1/2021 | Wu | ........................ H04L 9/0866 |
| 11,144,644 | B2 * | 10/2021 | Kim | ...................... G06F 21/565 |
| 2006/0200658 | A1 * | 9/2006 | Penkethman | ..... H04M 1/72406 |
| | | | | 713/2 |
| 2016/0021121 | A1 * | 1/2016 | Cui | .......................... H04L 63/20 |
| | | | | 726/1 |
| 2018/0189697 | A1 * | 7/2018 | Thomson | ............ H04L 63/1408 |
| 2018/0285101 | A1 * | 10/2018 | Yahav | ........................ G06F 8/75 |
| 2020/0125742 | A1 * | 4/2020 | Kounavis | .............. G06F 21/602 |

* cited by examiner

*Primary Examiner* — William S Powers
(74) *Attorney, Agent, or Firm* — Terrile, Cannatti & Chambers, LLP; Stephen A. Terrile

(57) ABSTRACT

A firmware management operation. The firmware management operation includes extracting a firmware image from an information handling system, the firmware image comprising a plurality of firmware regions; retrieving a known good firmware image, the known good firmware image comprising a plurality of known good firmware regions; and, performing a processor environment agnostic information handling system forensic vulnerability acceleration operation, the processor environment agnostic information handling system forensic vulnerability acceleration operation identifying potentially vulnerable firmware regions of the firmware image from the information handling system.

20 Claims, 10 Drawing Sheets

100

Service
Provider
Server
142

Network
140

Memory                           112

Operating System        118

BIOS                             116

Network
Port                           110

Other
Subsystems                 108

114

CPU                           102

I/O
(e.g., K/V/M)              104

Hard Drive
/ Disk                        106

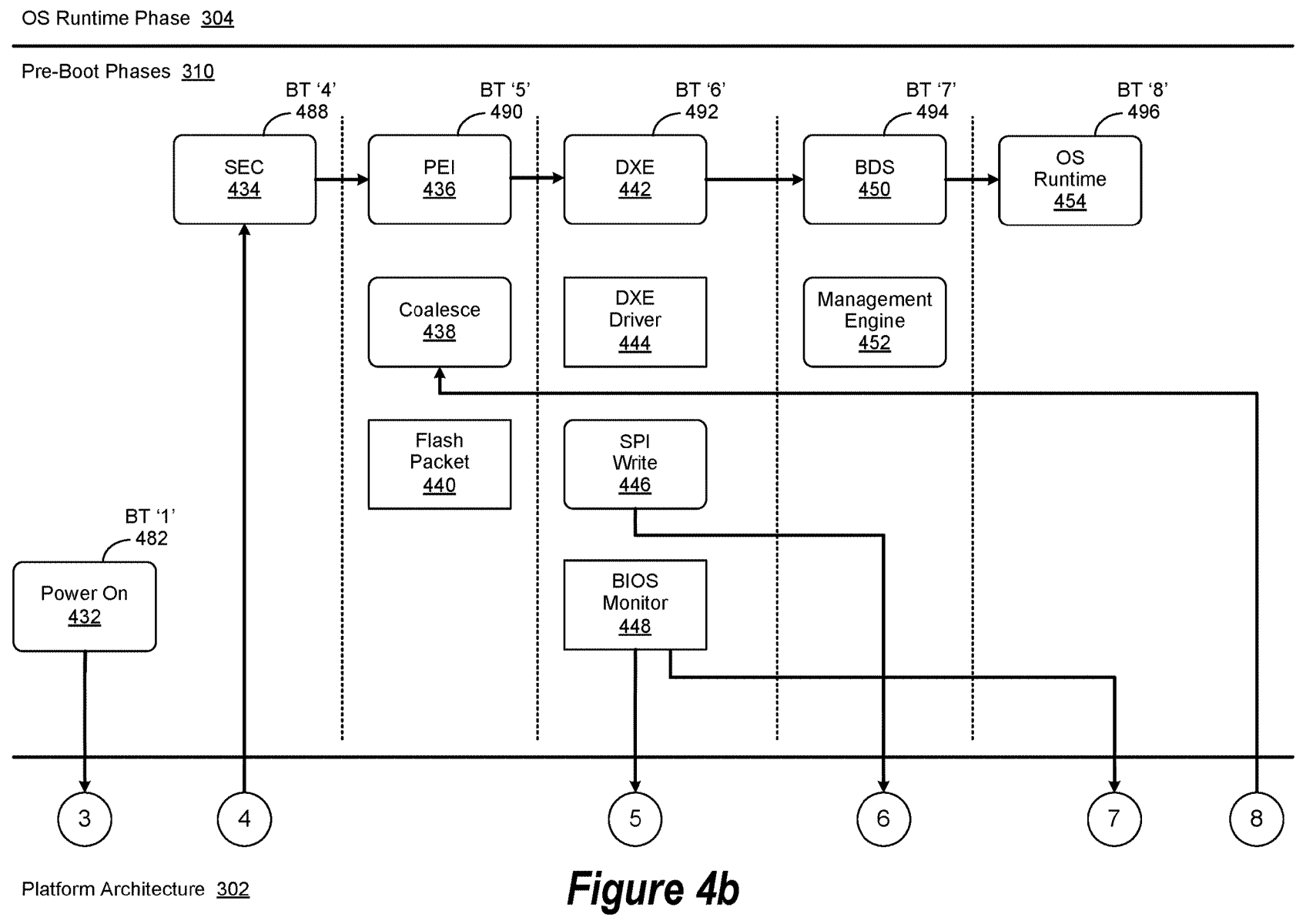

OS Runtime Phase 304

Pre-Boot Phases 310

BT '8'
496

OS
Runtime
454

BT '7'
494

BDS
450

Management
Engine
452

BT '6'
492

DXE
442

DXE
Driver
444

SPI
Write
446

BIOS
Monitor
448

BT '5'
490

PEI
436

Coalesce
438

Flash
Packet
440

BT '4'
488

SEC
434

BT '1'
482

Power On
432

3

4

5

6

7

8

Platform Architecture 302

*Figure 4b*

PROCESSOR ENVIRONMENT AGNOSTIC INFORMATION HANDLING SYSTEM FIRMWARE FORENSIC VULNERABILITY ACCELERATION OPERATION

BACKGROUND OF THE INVENTION

Field of the Invention

The present invention relates to information handling systems. More specifically, embodiments of the invention relate to performing a firmware management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a computer-implementable method for performing a firmware management operation, comprising: extracting a firmware image from an information handling system, the firmware image comprising a plurality of firmware regions; retrieving a known good firmware image, the known good firmware image comprising a plurality of known good firmware regions; and, performing a processor environment agnostic information handling system forensic vulnerability acceleration operation, the processor environment agnostic information handling system forensic vulnerability acceleration operation identifying potentially vulnerable firmware regions of the firmware image from the information handling system.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: extracting a firmware image from an information handling system, the firmware image comprising a plurality of firmware regions; retrieving a known good firmware image, the known good firmware image comprising a plurality of known good firmware regions; and, performing a processor environment agnostic information handling system forensic vulnerability acceleration operation, the processor environment agnostic information handling system forensic vulnerability acceleration operation identifying potentially vulnerable firmware regions of the firmware image from the information handling system.

In another embodiment the invention relates to a computer-readable storage medium embodying computer program code, the computer program code comprising computer executable instructions configured for: extracting a firmware image from an information handling system, the firmware image comprising a plurality of firmware regions; retrieving a known good firmware image, the known good firmware image comprising a plurality of known good firmware regions; and, performing a processor environment agnostic information handling system forensic vulnerability acceleration operation, the processor environment agnostic information handling system forensic vulnerability acceleration operation identifying potentially vulnerable firmware regions of the firmware image from the information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 4a through 4c are a simplified block diagram showing the performance of certain distributed firmware management operations;

DETAILED DESCRIPTION

Figure 1:
FIG. 1 shows a general illustration of components of an information handling system as implemented in the system and method of the present invention.

A system, method, and computer-readable medium are disclosed for performing a firmware management operation, described in greater detail herein. Various aspects of the invention reflect an appreciation that it is not uncommon for certain firmware components of a Basic Input/Output System (BIOS) associated with an information handling system (IHS) to be added, deleted, updated, revised, replaced, or restored over time. Likewise, various aspects of the invention reflect an appreciation that such BIOS firmware components are often added, deleted, updated, revised, replaced, or restored to provide security updates, fix known software bugs, improve performance, add new features and functionalities, and so forth.

Various aspects of the present disclosure include an appreciation that it can be desirable to perform a firmware analysis in a continuous deployment type environment. Various aspects of the present disclosure include an appreciation that updating firmware, such as a BIOS component, can lead to potential security vulnerabilities. Various aspects of the present disclosure include an appreciation that these potential security vulnerabilities may be present in different firmware regions such as vendor firmware region, backup catalog (BKC) firmware regions, third party firmware regions, open-source regions, etc. Various aspects of the present disclosure include an appreciation that these potential security vulnerabilities can be due to driver incompatibility issues. Various aspects of the present disclosure include an appreciation that it would be desirable to quickly generate digital learning algorithms which learn and identify the threat associated with various firmware modules.

Various aspects of the present disclosure include an appreciation that known pre-boot firmware suppliers often outsource identification of firmware vulnerabilities to external researchers and communities. Various aspects of the present disclosure include an appreciation that it can require an undesirable amount of time (e.g., over a month) to identify vulnerabilities by performing threat modeling and executing all specification and description language (SDL) controls. Various aspects of the present disclosure include an appreciation that manual processes are often involved in identifying vulnerabilities which often adds cost and time and thereby slows response in vulnerability acceleration.

Various aspects of the present disclosure include an appreciation that issues associated with No-POST/No-Boot as well as motherboard/SPI Flash failure conditions can require an information technology decision maker type (ITDM) solution. Various aspects of the present disclosure include an appreciation that such a solution can lead to additional support costs and can provide an undesired customer experience. Accordingly, various aspects of the present disclosure include an appreciation that it would be desirable to provide a digital forensic inspection function which can analyze the different firmware volumes for potential security vulnerabilities. Various aspects of the present disclosure include an appreciation that it would be desirable to provide a processor environment agnostic digital forensic function. It would be desirable to provide processor environment agnostic digital forensic function which can automatically inspect a large number (e.g., over one thousand systems). It would be desirable to provide processor environment agnostic digital forensic function which can provide on-board firmware inspection and self-driven remediation. It would be desirable to provide processor environment agnostic digital forensic function which can intelligently detect firmware vulnerabilities, runtime vulnerabilities, or a combination thereof, and generate secure responses (e.g., via secure score cards) to remediate the system vulnerabilities for better customer experience.

A system and method are disclosed for performing a processor environment agnostic information handling system forensic vulnerability acceleration operation. In certain embodiments, a processor environment agnostic information handling system forensic vulnerability acceleration system performs the processor environment agnostic information handling system forensic vulnerability acceleration operation.

In certain embodiments, the processor environment agnostic information handling system forensic vulnerability acceleration operation provides a digital forensic vulnerability acceleration (DFVA) protocol. In certain embodiments, the digital forensic vulnerability acceleration protocol dynamically learns firmware vulnerabilities, runtime vulnerabilities, or a combination thereof, and provides an end-to-end forensic analysis. In certain embodiments, the processor environment agnostic information handling system forensic vulnerability acceleration operation functions across a plurality of firmware regions. In certain embodiments, the plurality of firmware regions include a processor reference code firmware region, a memory training firmware region, an open source firmware region, a firmware volume (FV) firmware region, a firmware file system (FFS) firmware region, a non-volatile (NV) memory store firmware region, an embedded controller firmware region, a management engine firmware region, or a combination thereof.

In certain embodiments, the processor environment agnostic information handling system forensic vulnerability acceleration operation extracts a firmware layout identifies potentially vulnerable firmware regions from a particular information handling system. In certain embodiments, the processor environment agnostic information handling system forensic vulnerability acceleration operation embeds forensic signatures on the information handling system, e.g., via a payload. In certain embodiments, the processor environment agnostic information handling system forensic vulnerability acceleration operation export the forensic signatures to a remote server location such as a cloud forensic server. In certain embodiments, the exported forensic signatures are then processed at the remote server location for remediation.

In certain embodiments, the processor environment agnostic information handling system forensic vulnerability acceleration operation uses a forensic based self-heal protocol to deploy a remediation module to an information handling system. In certain embodiments, the remediation module is deployed using a forensic signature-based payload. In certain embodiments, the forensic signature-based payload is embedded with the information handling system.

In certain embodiments, the processor environment agnostic information handling system forensic vulnerability acceleration operation implements digital forensic vulnerability acceleration algorithms. In certain embodiments, the digital forensic vulnerability acceleration algorithms are implemented at different stages of firmware execution. In certain embodiments, the digital forensic vulnerability acceleration algorithms function with fewer processor environment agnostic vulnerability detection capabilities during a pre-boot PEI phase of firmware execution. In certain embodiments, the digital forensic vulnerability acceleration algorithms function with more processor environment agnostic vulnerability detection capabilities during a pre-boot DXE phase of execution. In certain embodiments, the digital forensic vulnerability acceleration algorithms function with even more processor environment agnostic vulnerability detection capabilities during an operating system runtime phase of execution.

In certain embodiments, the digital forensic vulnerability acceleration algorithms execute on the information handling system to provide an end to end firmware forensic analysis. In certain embodiments, the digital forensic vulnerability acceleration algorithms execute an image of the information handling system in an offline mode of operation. In certain embodiments, the firmware forensic analysis identifies which firmware section or firmware region may be corrupted, may be susceptible to an attack, may have a security vulnerability, or a combination thereof.

In certain embodiments, the processor environment agnostic information handling system forensic vulnerability acceleration system includes a processor environment agnostic system management component. In certain embodiments, the processor environment agnostic system management component provides a seamless interface between an embedded controller and operating system drivers. In certain embodiments, the seamless interface enables module specific interactions between the embedded controller and operating system drivers. In certain embodiments, the seamless interface enables module specific provides a secure interface between the embedded controller and operating system drivers. In certain embodiments, the seamless interface includes a seamless ACPI interface. In certain embodiments, the seamless interface interacts with the embedded controller and operating system drivers to dynamically provide monitoring based secure handshakes between the embedded controller, operating system drivers, or a combination thereof and peripheral devices.

In certain embodiments, the processor environment agnostic system management component includes a unified system management BIOS (SMBIOS) table. In certain embodiments, the unified system management BIOS table provides a seamless interface between an embedded controller and operating system drivers. In certain embodiments, the seamless interface enables module specific interactions between the embedded controller and operating system drivers. In certain embodiments, the seamless interface enables module specific provides a secure interface between the embedded controller and operating system drivers.

In certain embodiments, the processor environment agnostic information handling system audio digital signal processing trusted communication operation provides seamless and secure access to a serial peripheral interface (SPI) storage component. In certain embodiments, SPI storage component includes a SPI flash component. In certain embodiments, the processor environment agnostic information handling system audio digital signal processing trusted communication operation provides seamless and secure access for storing battery attributes. In certain embodiments, the battery attributes are stored within the SPI storage component.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system that can be used to implement the system and method of the present invention. In certain embodiments, the information handling system (IHS) 100 may be implemented to include a processor (e.g., central processor unit or "CPU") 102, various input/output (I/O) devices 104, such as a display, a keyboard, a mouse, a touchpad, or a touchscreen, and associated controllers, a hard drive or disk storage 106, and various other subsystems 108. In various embodiments, the IHS 100 may also be implemented to include a network port 110 operable to connect to a network 140, which in turn may be implemented to provide access to a service provider server 142. In various embodiments, the IHS 100 may likewise be implemented to include system memory 112, which is interconnected to the foregoing via one or more buses 114.

In various embodiments, system memory 112 may be configured to store program code, or data, or both, which in turn may be implemented to be accessible and executable by the CPU 102. In various embodiments, system memory 112 may be implemented using any suitable memory technology. Examples of such memory technology include random access memory (RAM), static RAM (SRAM), dynamic RAM (DRAM), synchronous dynamic RAM (SDRAM), non-volatile RAM (NVRAM), read-only memory (ROM), erasable programmable read-only memory (EPROM), electrically erasable programmable ROM (EEPROM), complementary metal-oxide-semiconductor (CMOS) memory, flash memory, or any other type of computer memory, whether it may be volatile or non-volatile. In various embodiments, system memory 112 may include one or more dual in-line memory modules (DIMMs), each containing one or more RAM modules mounted onto an integrated circuit board.

In various embodiments the system memory 112 may further be implemented to include a Basic Input/Output System (BIOS) 116, or an operating system (OS) 118, or both. Skilled practitioners of the art will be aware that BIOS 116, also known as System BIOS, ROM BIOS, or personal computer (PC) BIOS, is a type of firmware used to provide runtime services for an OS 118 to perform hardware initialization during the booting process of an IHS 100. Those of skill in the art will likewise be aware that firmware is a combination of persistent memory, program code, and data that provides low-level control of an IHS's 100 hardware. In various embodiments, the BIOS 116 may be implemented to initialize and test certain hardware components of its associated IHS 100 during the booting process (e.g., Power-On Self-Test, or "POST"), followed by loading a boot loader from a particular mass storage device, which in turn may then used to initialize a kernel.

In various embodiments, such BIOS 116 firmware may be implemented to provide hardware abstraction services to higher-level software such as an OS 118. In various embodiments, BIOS 116 firmware may be implemented in a less complex IHS 100 as an OS 118, performing all control, monitoring, and data manipulation functions. In various embodiments, certain components of a particular IHS 100 may be implemented to have its own firmware, which may store operational variables, data structures, or in general, any sort of information.

In various embodiments, NVRAM may be implemented to store a BIOS 116 associated with the IHS 100. In various embodiments, the NVRAM may also be implemented to hold the initial processor instructions required to bootstrap the IHS 100, store calibration constants, passwords, or setup information, or a combination thereof. In various embodiments, such setup information may be stored as variables in the NVRAM such that the variables are available during system boot from a power-off state. Various embodiments of the invention reflect an appreciation that such variables may need to be modified, revised, updated, restored, or replaced from time to time if they become corrupted. In various embodiments, an NVRAM driver may be implemented to use NVRAM headers to initialize and enable read/write services for updating or restoring such variables. Accordingly, as it relates to various embodiments of the invention, the terms "firmware," "NVRAM," or "BIOS" may be used generically and interchangeably.

In various embodiments, the functionality of a BIOS 116 may be implemented according to the Unified Extensible Firmware Interface (UEFI) specification, which describes how an IHS's 100 firmware interacts with a particular OS 118. Various embodiments of the invention reflect an appreciation that UEFI, as typically implemented, may offer certain features and benefits that are not available from traditional BIOS 116 implementations, such as faster boot times, improved security, support for larger storage devices, and higher definition graphical user interfaces (GUIs). In addition, UEFI stores all data related to the IHS's 100 initialization and startup within an .efi file, rather than on its associated firmware. In typical implementations, the .efi file may be stored on a special memory partition known as an EFI System Partition (ESP), which also contains the IHS's 100 bootloader.

In various embodiments, BIOS 116 may be instantiated as a distributed BIOS 116. As used herein, a distributed BIOS 116 broadly refers to a BIOS 116 that includes a plurality of BIOS 116 components, or a plurality of BIOS 116 variables, or a plurality of BIOS 116 storage locations, or a combination thereof. In various embodiments, the distributed BIOS 116 may be implemented to function with any of a plurality of processor environments, described in greater detail herein.

In various embodiments, the IHS 100 may be implemented to perform a firmware management operation. As used herein, a firmware management operation broadly refers to any task, function, operation, procedure, or process performed, directly or indirectly, to store, retrieve, aggregate, disaggregate, add, delete, modify, revise, update, replace, or restore one or more individual BIOS 116 components, described in greater detail herein, or one or more individual BIOS 116 variables, likewise described in greater detail herein, or a combination thereof, in one or more memory 112 locations associated with a particular IHS 100. In certain embodiments, the firmware management operation may be performed during operation of an IHS 100. In various embodiments, performance of the firmware management operation may result in the realization of improved operation of an IHS 100.

In certain embodiments, the firmware management operation includes a processor environment agnostic information handling system forensic vulnerability acceleration operation. In certain embodiments, a processor environment agnostic information handling system forensic vulnerability acceleration system performs the processor environment agnostic information handling system forensic vulnerability acceleration operation.

In certain embodiments, the processor environment agnostic information handling system forensic vulnerability acceleration operation provides a digital forensic vulnerability acceleration (DFVA) protocol. In certain embodiments, the digital forensic vulnerability acceleration protocol dynamically learns firmware vulnerabilities, runtime vulnerabilities, or a combination thereof, and provides an end-to-end forensic analysis. In certain embodiments, the processor environment agnostic information handling system forensic vulnerability acceleration operation functions across a plurality of firmware regions. In certain embodiments, the plurality of firmware regions include a processor reference code firmware region, a memory training firmware region, an open source firmware region, a firmware volume (FV) firmware region, a firmware file system (FFS) firmware region, a non-volatile (NV) memory store firmware region, an embedded controller firmware region, a management engine firmware region, or a combination thereof.

In certain embodiments, the processor environment agnostic information handling system forensic vulnerability acceleration operation extracts a firmware layout which identifies potentially vulnerable firmware regions from a particular information handling system. In certain embodiments, the processor environment agnostic information handling system forensic vulnerability acceleration operation embeds forensic signatures on the information handling system, e.g., via a payload. In certain embodiments, the processor environment agnostic information handling system forensic vulnerability acceleration operation exports the forensic signatures to a remote server location such as a cloud forensic server. In certain embodiments, the exported forensic signatures are then processed at the remote server location for remediation.

In certain embodiments, the processor environment agnostic information handling system forensic vulnerability acceleration operation uses a forensic based self-heal protocol to deploy a remediation module to an information handling system. In certain embodiments, the remediation module is deployed using a forensic signature-based payload. In certain embodiments, the forensic signature-based payload is embedded with the information handling system.

In certain embodiments, the processor environment agnostic information handling system forensic vulnerability acceleration operation implements digital forensic vulnerability acceleration algorithms. In certain embodiments, the digital forensic vulnerability acceleration algorithms are implemented at different stages of firmware execution. In certain embodiments, the digital forensic vulnerability acceleration algorithms function with fewer processor environment agnostic vulnerability detection capabilities during a pre-boot PEI phase of firmware execution. In certain embodiments, the digital forensic vulnerability acceleration algorithms function with more processor environment agnostic vulnerability detection capabilities during a pre-boot DXE phase of execution. In certain embodiments, the digital forensic vulnerability acceleration algorithms function with even more processor environment agnostic vulnerability detection capabilities during an operating system runtime phase of execution.

In certain embodiments, the digital forensic vulnerability acceleration algorithms execute on the information handling system to provide an end-to-end firmware forensic analysis. In certain embodiments, the digital forensic vulnerability acceleration algorithms execute on the firmware image of the information handling system in an offline mode of operation. In certain embodiments, the firmware forensic analysis identifies which firmware section or firmware region may be corrupted, may be susceptible to an attack, may have a security vulnerability, or a combination thereof.

Figure 2:
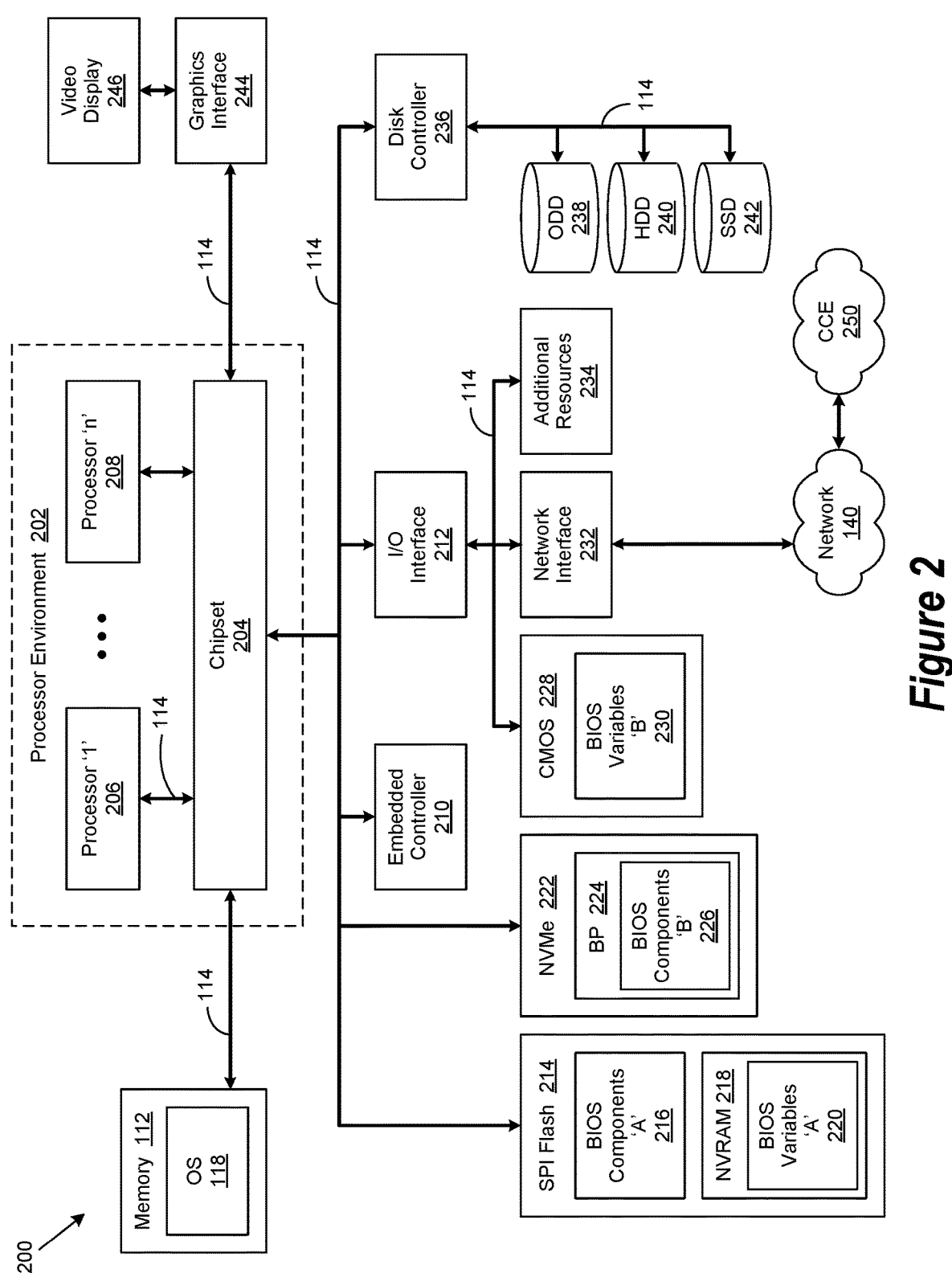
FIG. 2 shows a simplified block diagram of multi-processor operating environment.

FIG. 2 shows a simplified block diagram of multi-processor operating environment implemented in accordance with an embodiment of the invention. As used herein, a multi-processor operating environment 200, such as that shown in FIG. 2, broadly refers to any instrumentality, or aggregate of instrumentalities, that may be implemented to compute, classify, process, transmit, receive, retrieve, originate, switch, store, display, manifest, detect, record, reproduce, handle, or utilize, or a combination thereof, any form of information, intelligence, or data for business, scientific, control, entertainment, or other purpose, through the use of a particular processor environment (PE) 202. For example, the multi-processor environment 200 may be implemented as a personal computer, a laptop computer, a smart phone, a tablet computer or other consumer electronic device, a network server, a network storage device, or other network communication device, and so forth. In various embodiments, a multi-processor operating environment 200 may be implemented to include processing resources for executing machine-executable code, such as a central processing unit (CPU), a programmable logic array (PLA), an embedded device such as a System-on-a-Chip (SoC), or other control logic hardware.

In various embodiments, the multi-processor operating environment 200 may be implemented to include a PE 202. In various embodiments, the PE 202 may be implemented to include a chipset 204 and one or more processors '1' 206 through 'n' 208. In various embodiments, the processors '1' 206 through 'n' 208 implemented within a PE 202 may have the same, or different, architectures. In various embodiments, a chipset 204 may be implemented to support one or more architectures corresponding to the processors '1' 206 through 'n' 208. In various embodiments, the one or more architectures can include an x86 type processor architecture, an ARM type processor architecture, or a combination thereof. In various embodiments, a processor environment implementing an x86 type processor architecture provides an x86 type processor environment. In various embodiments, a processor environment implementing an ARM type processor architecture provides an ARM type processor environment.

As an example, processors '1' 206 through 'n' 208 of a particular PE 202 may be implemented to be the same in a server. In this example, each processor may be assigned to be a resource to one or more virtual machines (VMs). As another example, processor '1' 206 may be implemented as a multi-core processor in a graphics work station, while processor 'n' 208 may be implemented a Graphics Processing Unit (GPU), familiar to skilled practitioners of the art.

In various embodiments, each of the processors '1' 206 through 'n' 208 of a particular PE 202 may be implemented to run the same OS 118. Likewise, individual processors '1' 206 through 'n' 208 of a particular PE 202 may be implemented in various embodiments to run a different same OS 118. For example, processor '1' 206 may be implemented to run Microsoft® Windows®, while processor 'n' 208 may be implemented to run a version of Linux®.

In various embodiments, one or more PEs 202 selected from a plurality of PEs 202 may be implemented within the multi-processor operating environment 200. In certain of these embodiments, a particular PE 202 selected from a plurality of PEs 202 may be vendor-specific. In various embodiments, a particular PE 202 selected from a plurality of PEs 202 may be implemented as a System on a Chip (SoC), familiar to those of skill in the art. In various embodiments, the PE 202 may be implemented to include a plurality of vendor-specific SoCs provided by different vendors, or different versions of an SoC provided by the same vendor.

In various embodiments, the multi-processor operating environment 200 may likewise be implemented to include system memory 112. In various embodiments, the system memory 112 may in turn be implemented to include an operating system (OS) 118. In various embodiments, the multi-processor operating environment 200 may be implemented to include an embedded controller (EC) 210, an input/output (I/O) interface 212, a disk controller 236, and a graphics interface 244, or a combination thereof.

In various embodiments, the multi-processor operating environment 200 may likewise be implemented to include Nonvolatile Random Access Memory (NVRAM) 218, Serial Peripheral Interface (SPI) Flash memory 214, Nonvolatile Memory Express (NVMe) 222 memory, and a complementary metal-oxide-semiconductor (CMOS) 228 chip, or a combination thereof. Skilled practitioners of the art will be familiar with NVRAM 218, which in general usage broadly refers to Random Access Memory (RAM) that retains data if power is lost. In various embodiments, NVRAM 218 may be implemented to hold initial processor instructions used to bootstrap an information handling system (IHS), described in greater detail herein. In various embodiments, NVRAM 218 may be implemented in the form of flash memory, such as SPI Flash 214 memory, Erasable Programmable Read-Only Memory (EPROM), Electrically Erasable Programmable Read-Only Memory (EEPROM), or Ferroelectric RAM (F-RAM), Magnetoresistive RAM (MRAM), Phase-Change RAM (PRAM), or a combination thereof.

Those of skill in the art will likewise be familiar with SPI Flash 214 memory, which is a type of EEPROM memory implemented in accordance with the SPI standard, where the data stored within it is architecturally arranged in blocks. Various embodiments of the invention reflect an appreciation that while data stored within SPI Flash memory 214 is erased at the block level, it may be read or written at the byte level. Likewise, various embodiments of the invention reflect an appreciation that the ability to erase blocks of data within SPI Flash 214 memory may be advantageous in certain embodiments as erase speeds can be improved, and as a result, allow information to be stored more efficiently and compactly.

Likewise, skilled practitioners of the art will be familiar with NVMe, which is an open, logical device interface specification for accessing non-volatile storage media implemented within an IHS. Certain embodiments of the invention reflect an appreciation that NVMe 222 memory is currently available in various form factors, such as solid state drives (SSDs), Peripheral Component Interconnect Express (PCIe) memory cards, and M.2 memory cards. Various embodiments of the invention likewise reflect an appreciation that NVMe, as a logical device interface, is able to support low latency and internal parallelism for solid state storage devices, which can reduce Input/Output (I/O) overhead while providing other known performance improvements.

In various embodiments, the SPI Flash 214 memory may be implemented to receive, store, manage, and provide access to one or more Basic Input/Output System (BIOS) components 'A' 216. As used herein, a BIOS component broadly refers to one or more discrete portions of firmware program code that may be used, directly or indirectly, by a BIOS during its operation. In various embodiments, the SPI Flash 214 memory may be implemented to include certain NVRAM 218 memory. In various embodiments, the NVRAM 218 memory may in turn be implemented to receive, store, manage, and provide access to one or more BIOS variables 'A' 220, such as configuration settings, for use by the BIOS of an associated IHS.

In various embodiments, the NVMe 222 memory may be implemented to include a boot partition (BP) 224. Those of skill in the art will be familiar with the concept of a BP 224, which in common usage broadly refers to a primary memory partition that contains a boot loader, which is a portion of program code responsible for booting the OS 118 of an associated IHS. In various embodiments, the BP 224 may in turn be implemented to receive, store, manage, and provide access to one or more BIOS components 'B' 226. In various embodiments, the NVMe 222 memory may be implemented without a BP 224. Nonetheless, the NVMe 222 memory may be implemented in certain of these embodiments to still receive, store, manage, and provide access to one or more BIOS components 'B' 226.

In various embodiments, the I/O interface 212 may be implemented to interact with a complementary metal-oxide semiconductor (CMOS) 228 chip. In various embodiments, the CMOS 228 chip may be implemented to include a real-time clock and RAM memory that is backed-up by a battery. In various embodiments, the memory in the CMOS 228 chip may be implemented to receive, store, manage, and provide access to one or more BIOS variables 'B' 230.

In various embodiments, the I/O interface 212 may likewise be implemented to interact with a network interface 232, or additional resources 234. or both. In various embodiments, the network interface 232 may be implemented to provide access and connectivity to a network 140. In turn, the network 140 may be implemented in various embodiments to provide access and connectivity to a cloud computing environment (CCE) 250. Skilled practitioners of the art will be familiar with cloud computing, which is defined by the National Institute of Standards and Technology (NIST) as a model for enabling ubiquitous, convenient, on-demand network access to a shared pool of configurable computing resources (e.g., networks, servers, storage, applications, portions of program code, firmware components, data, services, and so forth) that can be rapidly provisioned and released with minimal management effort or service provider interaction.

In various embodiments, additional resources 234 may include a data storage system, additional graphics interfaces, a network interface card (NIC), a sound or video processing card, and so forth. In various embodiments, additional resources 234 may be implemented on a main circuit board of an IHS, or a separate circuit board or add-in card thereof, or a device that is external to the IHS, or a combination thereof. In various embodiments, the disk controller 236 may be implemented to interact with, and manage access to and from, an optical disk drive (ODD) 238, a hard disk drive (HDD) 240, or a solid state drive (SSD) 242, or a combination thereof.

In various embodiments, the graphics interface 242 may be implemented to present visual content on an associated video display. In certain of these embodiments, the graphics interface 242 may likewise be implemented to receive user gesture input from the video display 244, such as through the use of a touch-sensitive screen. In various embodiments, the system memory 112, the chipset 204, one or more processors '1' 206 through 'n' 208, the EC 210, the SPI Flash 214 memory, the NVMe 222 memory, the I/O interface 212, the CMOS 228 chip, the network interface 232, the additional resources 234, the disk controller 236, the ODD 238, the HDD 240, the SSD 242, the graphics interface 244, and the video display 246 may be implemented to provide and receive data to and from one another via one or more buses 114.

In various embodiments, a firmware management operation may be implemented to include a distributed firmware management operation. As used herein, a distributed firmware management operation broadly refers to a firmware management operation, described in greater detail herein, performed directly, or indirectly, within a multi-processor operating environment 200 to store, retrieve, aggregate, disaggregate, add, delete, modify, revise, update, replace, or restore one or more BIOS components 'A' 216 or 'B' 226, or one or more BIOS variables 'A' 220 or 'B' 230, or a combination thereof. In various embodiments, one or more BIOS components 'A' 216 or 'B' 226, or one or more BIOS variables 'A' 220 or 'B' 230, or a combination thereof, may be used, individually or in combination with one another, in the performance of a distributed firmware management operation. In various embodiments, performance of the distributed firmware management operation effectively decouples (i.e., minimizes the interrelationship between) one or more BIOS components 'A' 216 or 'B' 226, or one or more BIOS variables 'A' 220 or 'B' 230, or a combination thereof, from each other. In various embodiments, the performance of the distributed firmware management operation effectively decouples PE BIOS components from other platform BIOS components, as described herein.

In various embodiments, individual BIOS components 'A' 216 or 'B' 226 used in the performance of one or more distributed firmware management operations may be located within, or outside of, the multi-processor operating environment 200. As an example, a particular BIOS component 'A' 216 or 'B' 226 may initially be stored within a cloud computing environment (CCE) 250, described in greater detail herein. In this example, the firmware component may be retrieved from the CCE 250 by the multi-processor operating environment 200 and then respectively stored as firmware components 'A' 216 in NVRAM 218, or 'B' 226 in NVMe 222 memory, or a combination of the two.

Figure 3:
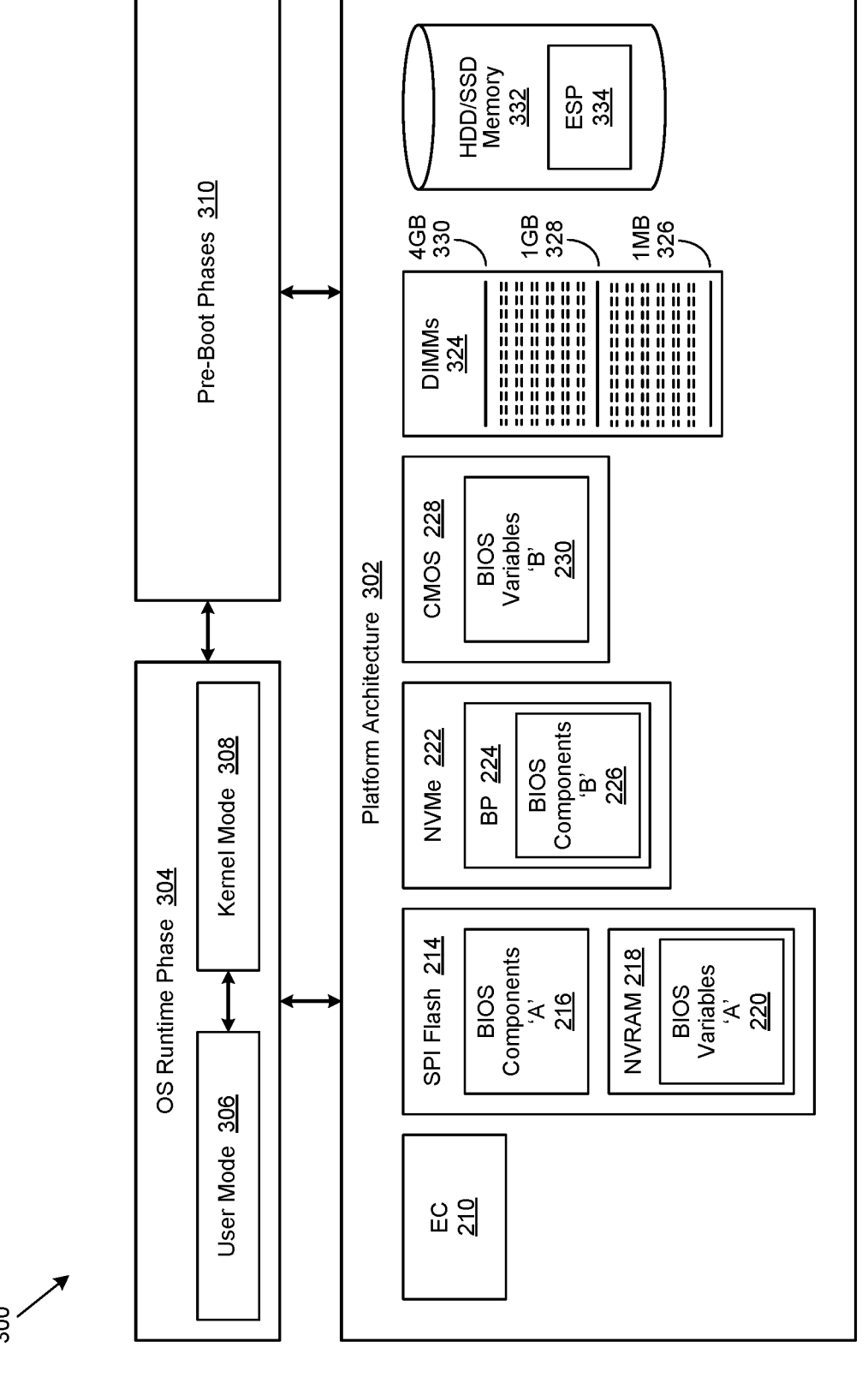
FIG. 3 shows a simplified block diagram of an architecture-specific distributed firmware management platform.

FIG. 3 shows a simplified block diagram of an architecture-specific distributed firmware management platform implemented in accordance with an embodiment of the invention. In various embodiments, the architecture-specific distributed firmware management platform (ASDFMP) 300, and its associated operation, may be implemented to accommodate architecture-specific aspects of a particular information handling system (IHS), described in greater detail herein. As an example, various IHS's may utilize different processors (e.g., Intel®, AMD®, Qualcom®, Broadcom®, NVidia®, and so forth), and as a result, may require the use of a Basic Input/Output System (BIOS) specific to their respective architecture, or associated operating system (OS), or both, at boot time. In various embodiments, the ASDFMP 300 may be implemented to perform one or more firmware management operations, described in greater detail herein.

In various embodiments, the ASDFMP 300 may be implemented to include a platform architecture 302. In certain of these embodiments, the platform architecture 302 may be implemented to include an embedded controller (EC) 210, Serial Peripheral Interface (SPI) Flash 214 memory, Non-volatile Memory Express (NVMe) 222 memory, and a complementary metal-oxide-semiconductor (CMOS) 228 chip, or a combination thereof, as described in greater detail herein. In various embodiments, the platform architecture 302 may likewise be implemented to include one or more dual in-line memory modules (DIMMs) 324, and certain hard disk drive (HDD) memory, or solid state drive (SSD) memory, or a combination of the two 332.

In various embodiments, the SPI Flash 214 memory may be implemented to receive, store, manage, and provide access to one or more BIOS components 'A' 216, as described in greater detail herein. In various embodiments, the SPI Flash 214 memory may likewise be implemented to include certain NVRAM 218 memory. In various embodiments, the NVRAM 218 memory may in turn be implemented to receive, store, manage, and provide access to one or more BIOS variables 'A' 220, as described in greater detail herein.

In various embodiments, the NVMe 222 memory may be implemented to include a boot partition (BP) 224, described in greater detail herein. In various embodiments, the BP 224 may in turn be implemented to receive, store, and provide access to, one or more BIOS components 'B' 226. In various embodiments, the NVMe 222 memory may be implemented without a BP 224. Nonetheless, the NVMe 222 memory may be implemented in certain of these embodiments to still receive, store, manage, and provide access to one or more BIOS components 'B' 226. In various embodiments, as likewise described in greater detail herein, the CMOS 228 chip may be implemented to receive, store, and provide access to, one or more BIOS variables 'B' 230.

In various embodiments, the one or more DIMMs 324 may be implemented to include one or more RAM modules mounted onto an integrated circuit board. In various embodiments, the one or more DIMMs 324 may be partitioned into a low region of memory, such as from 1 megabyte (MB) 326 to 1 gigabyte (GB) 328, and a high region of memory, such as from 1 GB 328 to 4 GB 330. In these embodiments, the amount of memory allocated to the low and high memory regions, the memory addresses within the one or more DIMMs 324 where such allocation may occur, and how such allocation may be performed, is a matter of design choice.

In various embodiments, the HDD/SDD memory 332 may be implemented to include an extensible firmware interface (EFI) system partition (ESP) 334. Skilled practitioners of the art will be familiar with an ESP 334, which is usually implemented as a partition on a mass storage device, such as HDD/SSD memory 332, which in turn is used by an associated IHS implemented with a Unified Extensible Firmware Interface (UEFI), described in greater detail herein. In such implementations, the UEFI loads files stored within the ESP 334 to begin installing Operating System (OS) and associated utility files. In various embodiments, the ESP 334 may be implemented to contain the boot loaders, or kernel images, for all installed OS's that may be contained in other memory partitions, device driver files for hardware devices present in its associated IHS and used by the firmware at boot time, system utility programs that are intended to be run before a particular OS is booted, and data files such as error logs.

In various embodiments, the ASDFMP 300 may be implemented to include an OS runtime phase 304, and various pre-boot phases 310, all of which are described in greater detail herein. In various embodiments, the OS runtime phase 304 may be implemented to include a user mode 306 and a kernel mode 308, both of which are likewise described in greater detail herein. In various embodiments, certain components, processes, or operations, or a combination thereof, respectively associated with the OS runtime phase 304 and the pre-boot phases 310, may be implemented to interact with various components of the platform architecture 302, as likewise described in greater detail herein.

Figure 4A:
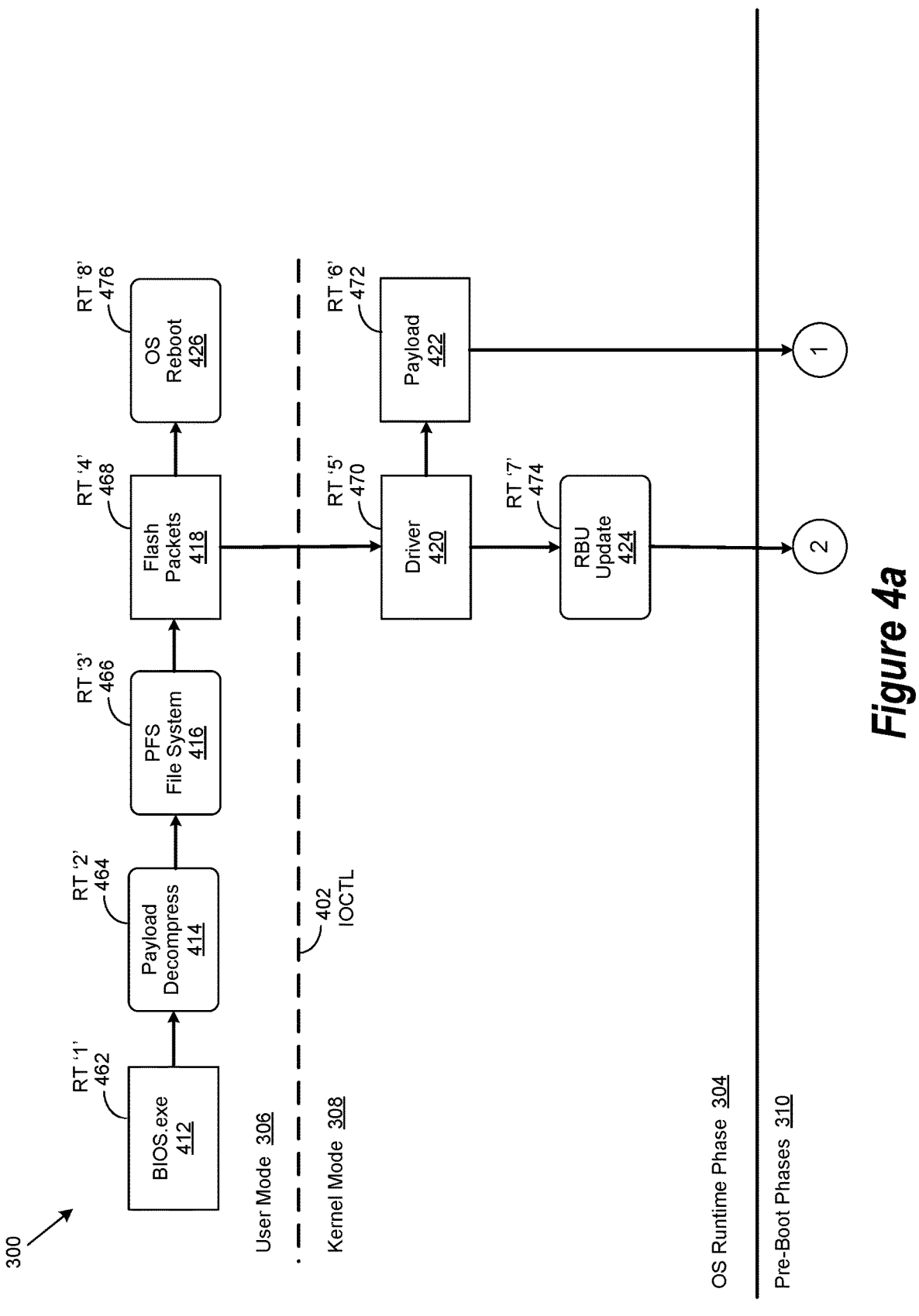
Figure 4C:
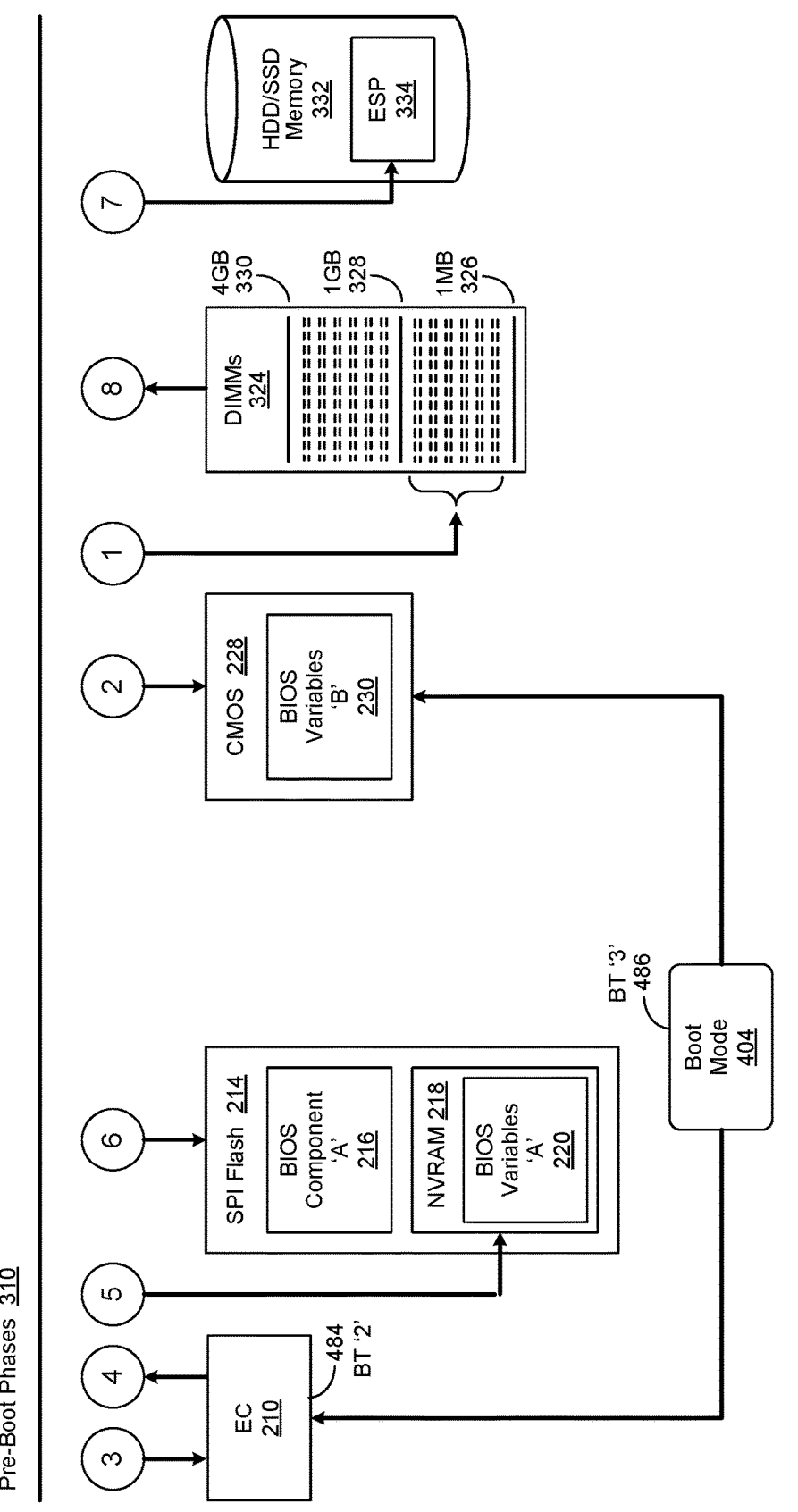

FIGS. 4a through 4c are a simplified block diagram showing an architecture-specific distributed firmware management platform (ASDFMP) implemented in accordance with an embodiment of the invention to perform certain distributed firmware management operations. In certain embodiments, the ASDFMP 300 may be implemented to include an Operating System (OS) runtime phase 304, various pre-boot phases 310, and a platform architecture 302. In various embodiments, as described in greater detail herein, the platform architecture 302 may be implemented to include an embedded controller (EC) 210, Serial Peripheral Interface (SPI) Flash 214 memory, and a complementary metal-oxide-semiconductor (CMOS) 228 chip, or a combination thereof. In various embodiments, the platform architecture 302 may likewise be implemented to include one or more dual in-line memory modules (DIMMs) 324, and certain hard disk drive (HDD) memory, or solid state drive (SSD) memory, or a combination of the two 332.

In various embodiments, the SPI Flash 214 memory may be implemented to receive, store, manage, and provide access to one or more Basic Input/Output System (BIOS) components 'A' 216, described in greater detail herein. In various embodiments, the SPI Flash 214 memory may likewise be implemented to include certain NVRAM 218 memory, likewise described in greater detail herein. In various embodiments, the NVRAM 218 memory may in turn be implemented to receive, store, manage, and provide access to one or more BIOS variables 'A' 220, as described in greater detail herein.

In various embodiments, the OS runtime phase 304 may be implemented to include a user mode 306 and a kernel mode 308. Skilled practitioners of the art will be aware that user mode 306 generally refers to a restricted mode that limits software access to system resources, while kernel mode 308 generally refers to a privileged mode that allows software to access system resources and perform privileged operations. In various embodiments, an Input/Output Control (IOCTL) 402 operation, familiar to those of skill in the art, may be performed to switch between user mode 306 and kernel mode 308. Those of skill in the art will likewise be aware that such mode switching generally involves saving the current context of an associated information handling system's (IHS's) processor in memory, switching to the new mode, and loading the new context into the processor.

Referring now to FIG. 4a, a distributed firmware management operation may be initiated by the ASDFMP 300 receiving a BIOS.exe 412 file in runtime (RT) step '1'. In various embodiments, the BIOS.exe 412 file may be implemented as the combination of a flash memory utility and a payload of firmware components, described in greater detail herein. Then, in RT step '2' 464 the BIOS.exe 412 is executed to decompress 414 its payload, which is then converted in RT step '3' 466 into a payload file system (PFS) 416.

Flash memory packets 418 are then extracted from the PFS 416 if RT step '4' 468 and provided to a memory driver 420 in RT step '5' 470 to create a memory payload 422. The resulting memory payload 422 is then loaded into a lower memory region of one or more DIMMs 324, such as between 1 megabyte (MB) 326 and 1 gigabyte (GB) 328. Thereafter, a Remote BIOS Update (RBU) 424 operation may be performed in RT step '7' to update certain BIOS variables 'B' 230 stored in the CMOS 328 chip. An OS reboot 426 operation is then performed in RT step '8' 476.

Once the OS reboot 426 operation has been performed in RT step '8' 476, power is applied 432 to the ASDFMP 300 in pre-boot time (BT) step '1' 432. An embedded controller (EC) 210 is then invoked in BT step '2' 464 which results in the activation of a boot mode 404 in BT step '3' 486. In various embodiments, the boot mode 404 may be activated in BT step '3' 486 by retrieving, and using, certain BIOS variables 'B' stored in the CMOS 228 chip.

One or more security (SEC) 434 phase operations may then be performed in BT step '4' 488, followed by the performance of one or more Pre Extensible Firmware Interface (EFI) Initialization (PEI) 436 phase operations in BT step '5' 490. In various embodiments, the one or more SEC 434 phase operations may be implemented to secure the boot process by preventing the loading of Unified Extensible Firmware Interface (UEFI) drivers, or boot loaders, that are not signed with an acceptable digital signature. In various embodiments, a trusted platform module (TPM), familiar to skilled practitioners of the art, may be used in the performance of one or more SEC 434 phase operations.

Those of skill in the art will likewise be aware that PEI 436 phase operations are generally performed to initialize permanent memory within a particular IHS to load and invoke initial configuration routines specific to its associated processor environment (PE), described in greater detail herein. In various embodiments, performance of the PEI 436 phase operation in BT step '5' 490 may include one of more packet coalescing 438 operations being performed to coalesce individual flash memory packets previously stored in a low memory region of one or more DIMMs in RT step '6' 472. In various embodiments, the individual flash memory packets may then be stored as one or more coalesced flash memory packets 440.

In various embodiments, a firmware management protocol (FMP) may be used in the performance of a Driver execution Environment (DXE) 442 phase operation in BT step 6' 492 to perform an SPI write 446 operation to write the coalesced flash memory packets 440 to SPI Flash 214 memory. Skilled practitioners of the art will be familiar with a DXE 442, which as typically implemented includes a DXE Core, a DXE Dispatcher, and one or more DXE drivers 444. In general, the DXE Core component is responsible for producing a set of boot services, DXE services, and RT Services. Likewise, the DXE Dispatcher component is responsible for discovering and executing DXE drivers 444 in the correct order. In turn, the DXE drivers 444 are responsible for initializing the IHS's processor environment (PE), described in greater detail herein. In various embodiments, the SPI write 446 operation may be performed to write certain flash memory packets associated with certain BIOS components 'A' 216, or certain BIOS variables 'A' 220, or a combination of the two. In various embodiments, the flash memory packets may contain new, updated, modified, revised, or replacement BIOS components 'A' 216, or BIOS variables 'A' 220, or a combination of the two.

In various embodiments, a BIOS monitor 448, such as BIOS IQ, produced by Dell® Incorporated, of Round Rock, Texas, may be implemented within the DXE 442 phase to monitor the current values of certain BIOS variables 'A' 220 stored in NVRAM 218, which in certain embodiments, may be implemented within SPI Flash 214 memory. In various embodiments, the BIOS monitor 448 may likewise be implemented to monitor the status of certain data stored in the ESP 334, described in greater detail herein. Once DXE 442 phase operations are completed in BT step '6' 494, the OS is then booted. In various embodiments, a boot device selection (BDS) 450 phase operation is then performed in BT step '7' 494 to select a boot device. In various embodiments, a management engine (ME) 452, such as the ME 452 produced by Intel® Corporation of Santa Clara, California, may be implemented to use the selected boot device in BT step '8' 496 to boot the ASDFMP 300 into an OS runtime 454 state.

Figure 5A:
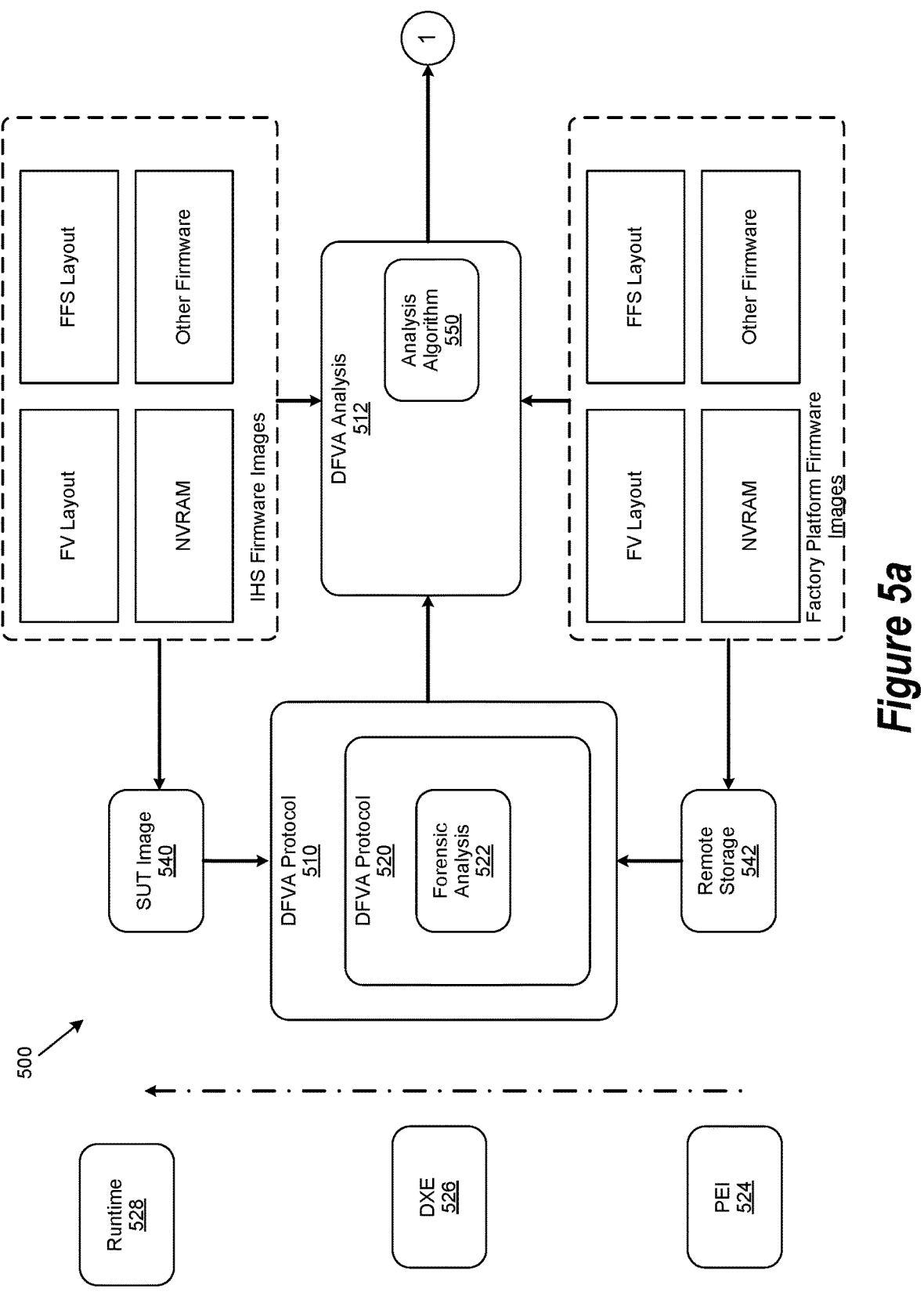
FIGS. 5a and 5b are a simplified block diagram of an operational view of a processor environment agnostic information handling system firmware forensic vulnerability acceleration architecture.
Figure 5B:
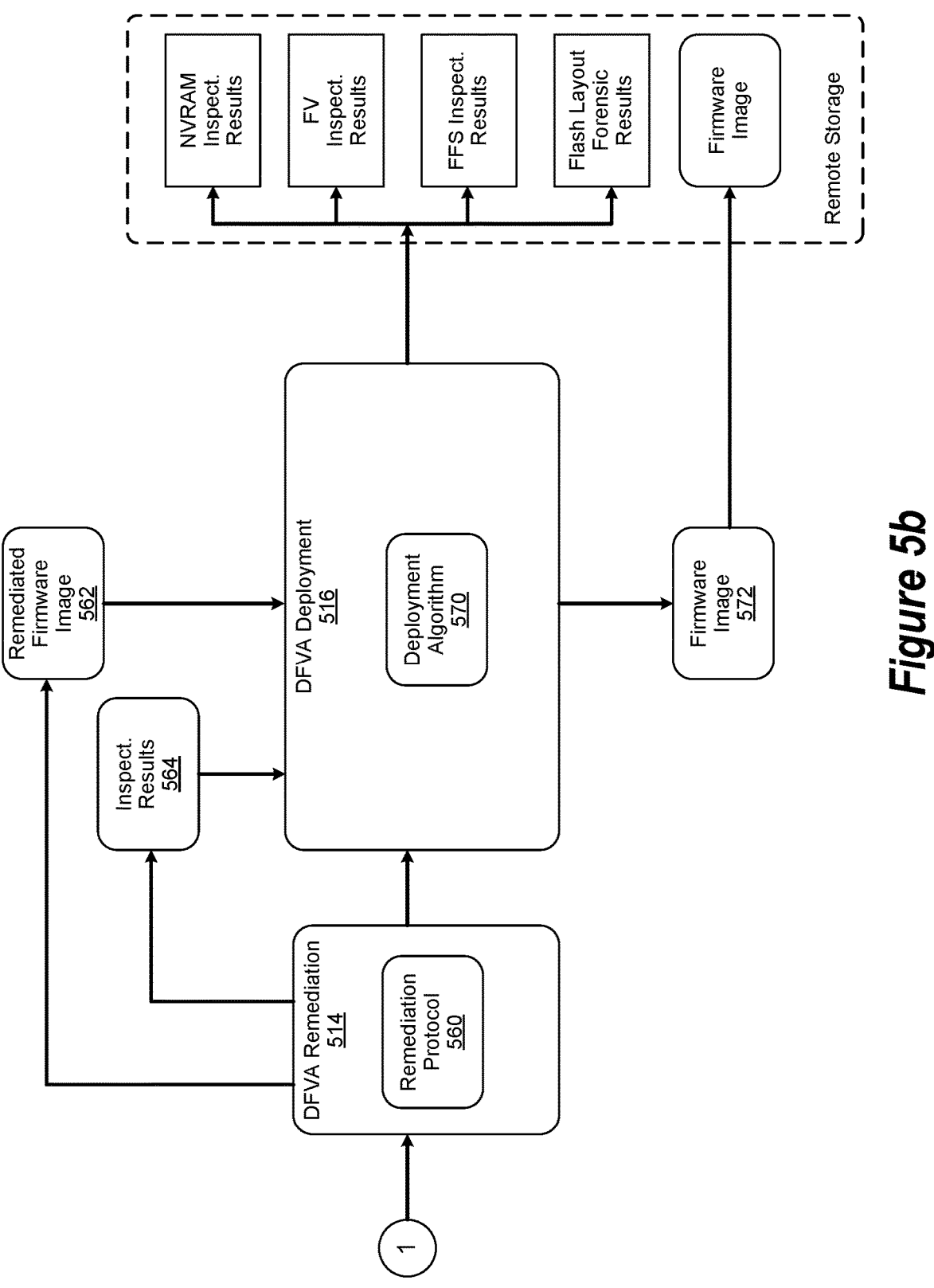

FIGS. 5a and 5b show a simplified block diagram of an operational view of a processor environment agnostic information handling system firmware forensic vulnerability acceleration architecture 500. In certain embodiments, the processor environment agnostic information handling system firmware forensic vulnerability acceleration architecture performs a processor environment agnostic information handling system firmware forensic vulnerability acceleration operation. As used herein, a processor environment agnostic information handling system firmware forensic vulnerability acceleration operation broadly refers to a firmware management operation, described in greater detail herein, performed directly, or indirectly, within a multi-processor operating environment to identify, remediate, or a combination thereof, firmware security vulnerabilities, firmware runtime security vulnerabilities, or a combination thereof.

In certain embodiments, the processor environment agnostic information handling system firmware forensic vulnerability acceleration architecture 500 includes a digital forensic vulnerability acceleration protocol module 510, a digital forensic vulnerability acceleration analysis module 512, a digital forensic vulnerability acceleration remediation module 514, a digital forensic vulnerability acceleration deployment module 516, or a combination thereof. In certain embodiments, processor environment agnostic information handling system firmware forensic vulnerability acceleration architecture includes a digital forensic vulnerability acceleration protocol module 510 performs a digital forensic vulnerability acceleration protocol operation. In certain embodiments, the digital forensic vulnerability acceleration analysis module 512 performs a digital forensic vulnerability acceleration analysis operation. In certain embodiments, the digital forensic vulnerability acceleration remediation module 514 performs a digital forensic vulnerability acceleration remediation operation. In certain embodiments, the digital forensic vulnerability acceleration deployment module 516 performs a digital forensic vulnerability acceleration deployment operation.

In certain embodiments, the processor environment agnostic information handling system firmware forensic vulnerability acceleration operation includes the digital forensic vulnerability acceleration protocol operation, the digital forensic vulnerability acceleration analysis operation, the digital forensic vulnerability acceleration remediation operation, the digital forensic vulnerability acceleration deployment operation, or a combination thereof. As used herein, a digital forensic vulnerability acceleration protocol operation broadly refers to broadly refers to a processor environment agnostic information handling system firmware forensic vulnerability acceleration operation, described in greater detail herein, performed directly, or indirectly, within a multi-processor operating environment to generate a protocol for use in identifying, remediating, or a combination thereof, firmware security vulnerabilities, firmware runtime security vulnerabilities, or a combination thereof. As used herein, a digital forensic vulnerability acceleration analysis operation broadly refers to a processor environment agnostic information handling system firmware forensic vulnerability acceleration operation, described in greater detail herein, performed directly, or indirectly, within a multi-processor operating environment to analyze one or more firmware components to identify firmware security vulnerabilities, firmware runtime security vulnerabilities, or a combination thereof, contained within or associated with the one or more firmware components.

As used herein, a digital forensic vulnerability acceleration remediation operation broadly refers to a processor environment agnostic information handling system firmware forensic vulnerability acceleration operation, described in greater detail herein, performed directly, or indirectly, within a multi-processor operating environment to analyze one or more firmware components to remediate firmware security vulnerabilities, firmware runtime security vulnerabilities, or a combination thereof, contained within or associated with the one or more firmware components. As used herein, a digital forensic vulnerability acceleration deployment operation broadly refers to a processor environment agnostic information handling system firmware forensic vulnerability acceleration operation, described in greater detail herein, performed directly, or indirectly, within a multi-processor operating environment to preserve, maintain, deploy, distribute, or a combination thereof, information associated with the identification, inspection, remediation, or a combination thereof, of firmware security vulnerability forensics, firmware security vulnerabilities, firmware runtime security vulnerabilities, or a combination thereof, contained within or associated with the one or more firmware components.

More specifically, the digital forensic vulnerability acceleration protocol operation implements a digital forensic vulnerability acceleration protocol 520. As used herein, a digital forensic vulnerability acceleration protocol broadly defines a set of rules for formatting and processing data associated with performance of a processor environment agnostic information handling system firmware forensic vulnerability acceleration operation, described in greater detail herein. In certain embodiments, the digital forensic vulnerability acceleration protocol dynamically learns firmware security vulnerabilities, runtime security vulnerabilities, or a combination thereof. In certain embodiments, the digital forensic vulnerability acceleration protocol 520 performs an end-to-end forensic analysis 522. In certain embodiments, the end-to-end forensic analysis provides a forensic analysis of the firmware of the information handling system across the various firmware operational phases (e.g., the PEI phase 524, the DXE phase 526, the runtime phase 528, etc.) of the information handling system.

In certain embodiments, the digital forensic vulnerability acceleration protocol 520 implements a plurality of pre boot staged modules which provide the support to extract the different firmware payload regions from the firmware of the information handling system. These payload and firmware regions are then used to perform a digital firmware analysis. In certain embodiments, the digital forensic vulnerability acceleration protocol 520 implements stage based firmware module which executes as a background process to extract the different sections of the firmware image to provide a system under test image 540. In certain embodiments, the digital forensic vulnerability acceleration protocol 520 retrieves a known good version of the firmware regions. In certain embodiments, the known good version of the firmware regions are retrieved from a remote storage location. In certain embodiments, the remote storage location includes a cloud forensic server 542. In certain embodiments, the known good version of the firmware regions may be used to generate a known safe recovery image of the firmware regions.

In certain embodiments, the digital forensic vulnerability acceleration protocol 520 supports a processor environment agnostic firmware architecture. In certain embodiments, the digital forensic vulnerability acceleration protocol 520 supports forensic analysis of a plurality of firmware regions. In certain embodiments, the plurality of firmware regions include a processor reference code firmware region (e.g., an x86 type processor environment reference code firmware region), a memory training firmware region (e.g., an ARM type processor environment memory training firmware region), an open source firmware region (e.g., an extensible firmware interface (EFI) development kit (EDK) type UEFI service firmware region), a firmware volume (FV) firmware region, a firmware file system (FFS) firmware region, a non-volatile (NV) memory store firmware region, an embedded controller firmware region, a management engine firmware region, or a combination thereof.

In certain embodiments, the digital forensic vulnerability acceleration analysis operation implements a digital forensic vulnerability acceleration analysis algorithm 550. As used herein, a digital forensic vulnerability acceleration analysis algorithm broadly refers to a set of commands used to perform an operation associated with performance of a processor environment agnostic information handling system firmware forensic vulnerability acceleration operation, described in greater detail herein. In certain embodiments, execution of the digital forensic vulnerability acceleration analysis algorithm studies one or more firmware regions, firmware images, or a combination thereof, to identify security related issues, vulnerability related issues, or a combination thereof, associated with the one or more firmware regions, firmware images, or a combination thereof.

In certain embodiments, the digital forensic vulnerability acceleration analysis algorithm executes on the information handling system being analyzed. In certain embodiments, the digital forensic vulnerability acceleration analysis algorithm executes on an offline image. In certain embodiments, the digital forensic vulnerability acceleration analysis algorithm provides the end to firmware forensic analysis of the firmware. In certain embodiments, the digital forensic vulnerability acceleration analysis algorithm identifies any sections of the firmware or region of the firmware which are corrupted or have been attacked by a security vulnerability.

In certain embodiments, the digital forensic vulnerability acceleration analysis algorithm is implemented to execute at different stages of BIOS operation. In certain embodiments, the digital forensic vulnerability acceleration analysis algorithm processor environment agnostic vulnerability detection initially starts with fewer capabilities during the PEI phase of firmware execution. In certain embodiments, the digital forensic vulnerability acceleration algorithms function with more processor environment agnostic vulnerability detection capabilities during a pre-boot DXE phase of execution. In certain embodiments, the digital forensic vulnerability acceleration algorithms function with even more processor environment agnostic vulnerability detection capabilities during an operating system runtime phase of execution.

In certain embodiments, the digital forensic vulnerability acceleration remediation operation implements a digital forensic vulnerability acceleration remediation protocol 560. As used herein, a digital forensic vulnerability acceleration analysis remediation protocol broadly refers to a set of rules for formatting and processing data associated with performance of a processor environment agnostic information handling system firmware forensic vulnerability acceleration analysis remediation operation, described in greater detail herein. In certain embodiments, the digital forensic vulnerability acceleration analysis remediation protocol functions as a forensic based self-heal protocol. In certain embodiments, the digital forensic vulnerability acceleration analysis remediation protocol allows deployment of a remediation module to an information handling system. In certain embodiments, the remediation module is deployed using a forensic signature-based payload. In certain embodiments, the deployed forensic signature-based payload is embedded with the information handling system. In certain embodiments, the digital forensic vulnerability acceleration remediation operation generates a remediated firmware image 562, one or more remediation inspection results 564, or a combination thereof. In certain embodiments, the digital forensic vulnerability acceleration analysis remediation protocol is used to communicate the remediated firmware image, the one or more remediation inspection results, or a combination thereof, to the digital forensic vulnerability acceleration deployment module. In certain embodiments, the one or more remediation inspection results include NVRAM remediation inspection results, FV remediation inspection results, FFS remediation inspection results, Flash layout remediation inspection results, or a combination thereof.

In certain embodiments, the digital forensic vulnerability acceleration remediation operation executes a set of remediation operations based on firmware image forensic analysis. In certain embodiments, the set of remediation operations are self-driven based on a forensic report generated by the analysis. In certain embodiments, the set of remediation operations execute on-demand. In certain embodiments, the set of remediation operations execute on a plurality of firmware regions. In certain embodiments, the set of remediation operations include a flash map remediation operation, a firmware volume remediation operation, a firmware file system remediation operation, an NVRAM remediation operation, an embedded controller remediation operation, a management engine firmware remediation operation, or a combination thereof.

In certain embodiments, the digital forensic vulnerability acceleration deployment operation implements a digital forensic vulnerability acceleration deployment algorithm 570. As used herein, a digital forensic vulnerability acceleration deployment algorithm broadly refers to a set of commands used to perform an operation associated with performance of a processor environment agnostic information handling system firmware forensic vulnerability acceleration deployment operation, described in greater detail herein. In certain embodiments, the digital forensic vulnerability acceleration deployment algorithm 570 includes a build algorithm. In certain embodiments, the digital forensic vulnerability acceleration deployment algorithm 570 includes scripts which are command line based. In certain embodiments, the digital forensic vulnerability acceleration deployment algorithm 570 may be executed for any firmware images to generate an end-to-end firmware image analysis report. In certain embodiments, the end-to-end firmware image analysis report provides information regarding remote issue root causes, vulnerability, or a combination thereof. In certain embodiments, the digital forensic vulnerability acceleration deployment algorithm 570 may be executed remotely. In certain embodiments, the digital forensic vulnerability acceleration deployment algorithm 570 allows on system dynamic firmware analysis and remediation. In certain embodiments, the digital forensic vulnerability acceleration deployment algorithm 570 allows remote deployment of information associated with digital forensic vulnerability remediation. In certain embodiments, the information associated with the digital forensic vulnerability remediation includes a remediated firmware image, one or more forensic inspection results, or a combination thereof. In certain embodiments, the one or more forensic inspection results include NVRAM inspection results, FV inspection results, FFS inspection results, Flash layout inspection results, or a combination thereof. In certain embodiments, the NVRAM inspection results include differentiated variable information, corrupted variable information, or a combination thereof. In certain embodiments, the FV inspection results include corrupted firmware volume results. In certain embodiments, the FFS inspection results include an updated FFS. In certain embodiments, the Flash layout inspection results include changes in a flash layout such as those resulting from updated or recovering portions of the flash memory.

Figure 6:
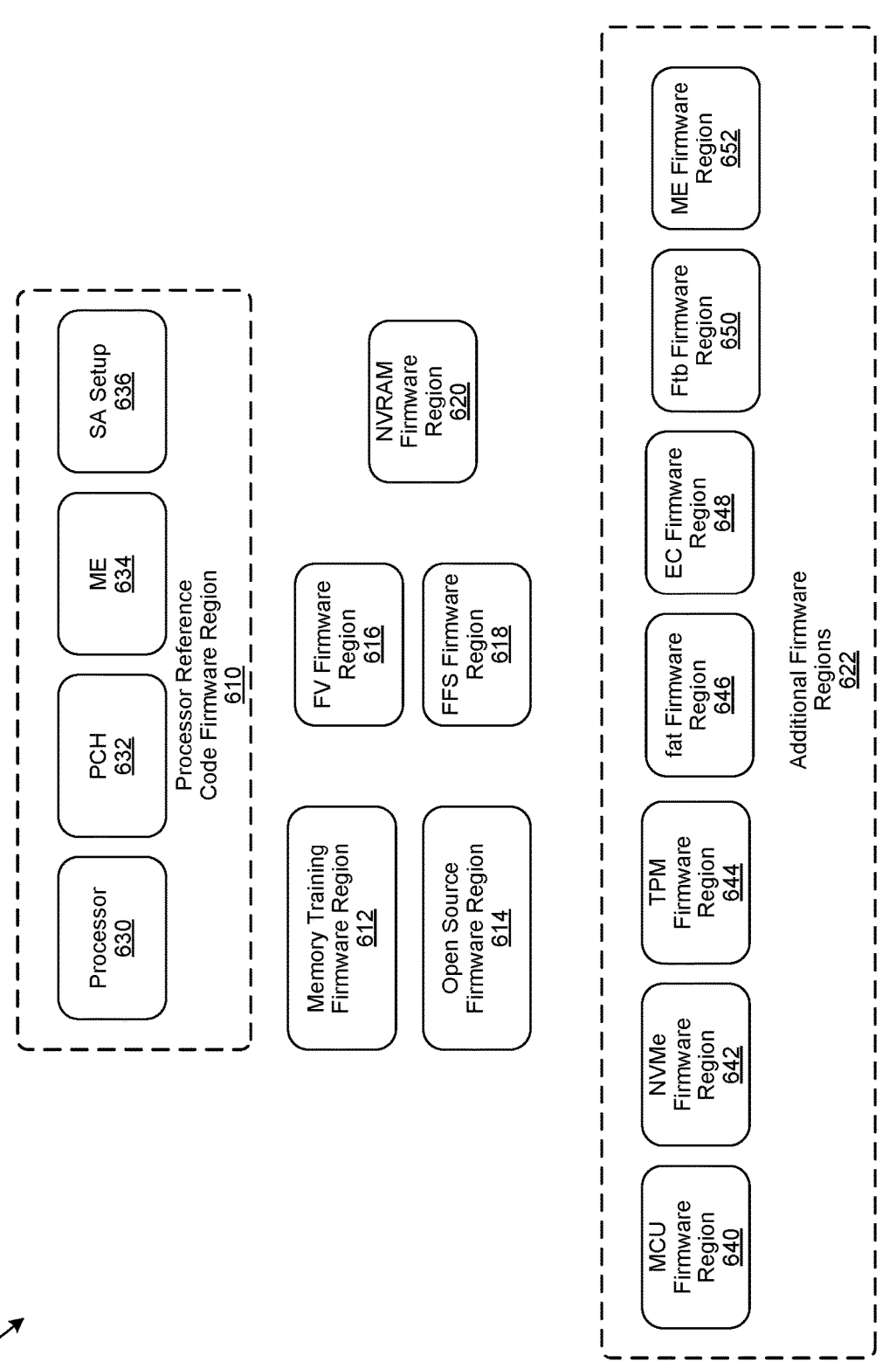
FIG. 6 is a simplified block diagram of processor environment agnostic information handling system firmware forensic vulnerability acceleration firmware regions; and, FIG. 7 is a simplified block diagram showing the performance of processor environment agnostic information handling system firmware forensic vulnerability acceleration operation.

FIG. 6 shows a simplified block diagram of processor environment agnostic information handling system firmware forensic vulnerability acceleration firmware regions 600. In certain embodiments, a digital forensic vulnerability acceleration protocol 520 supports communication with one or more of the processor environment agnostic information handling system firmware forensic vulnerability acceleration firmware regions 600.

In certain embodiments, the processor environment agnostic information handling system firmware forensic vulnerability acceleration firmware regions 600. include a processor reference code firmware region 610 (e.g., an x86 type processor environment reference code firmware region), a memory training firmware region 612 (e.g., an ARM type processor environment memory training firmware region), an open source firmware region 614 (e.g., an extensible firmware interface (EFI) development kit (EDK) type UEFI service firmware region), a firmware volume (FV) firmware region 616, a firmware file system (FFS) firmware region 618, a non-volatile (NV) memory store firmware region 620, as well as one or more additional firmware regions 622, or a combination thereof.

In certain embodiments, the processor reference code firmware region 610 includes a processor portion 630, a platform controller hub (PCH) portion 632, a management engine (ME) portion 634, a systems analysis (SA) setup portion 636, or a combination thereof. In certain embodiments, the one or more additional firmware regions 622 include a MicroController Unit (Mcu) firmware region 640, an NVMe firmware region 642, a trusted platform module (TPM) firmware region 644, a file allocation table (fat) firmware region 646, an embedded controller firmware region 648, a file transfer batch (Ftb) firmware region 650, a management engine firmware region 652, or a combination thereof.

Figure 7:
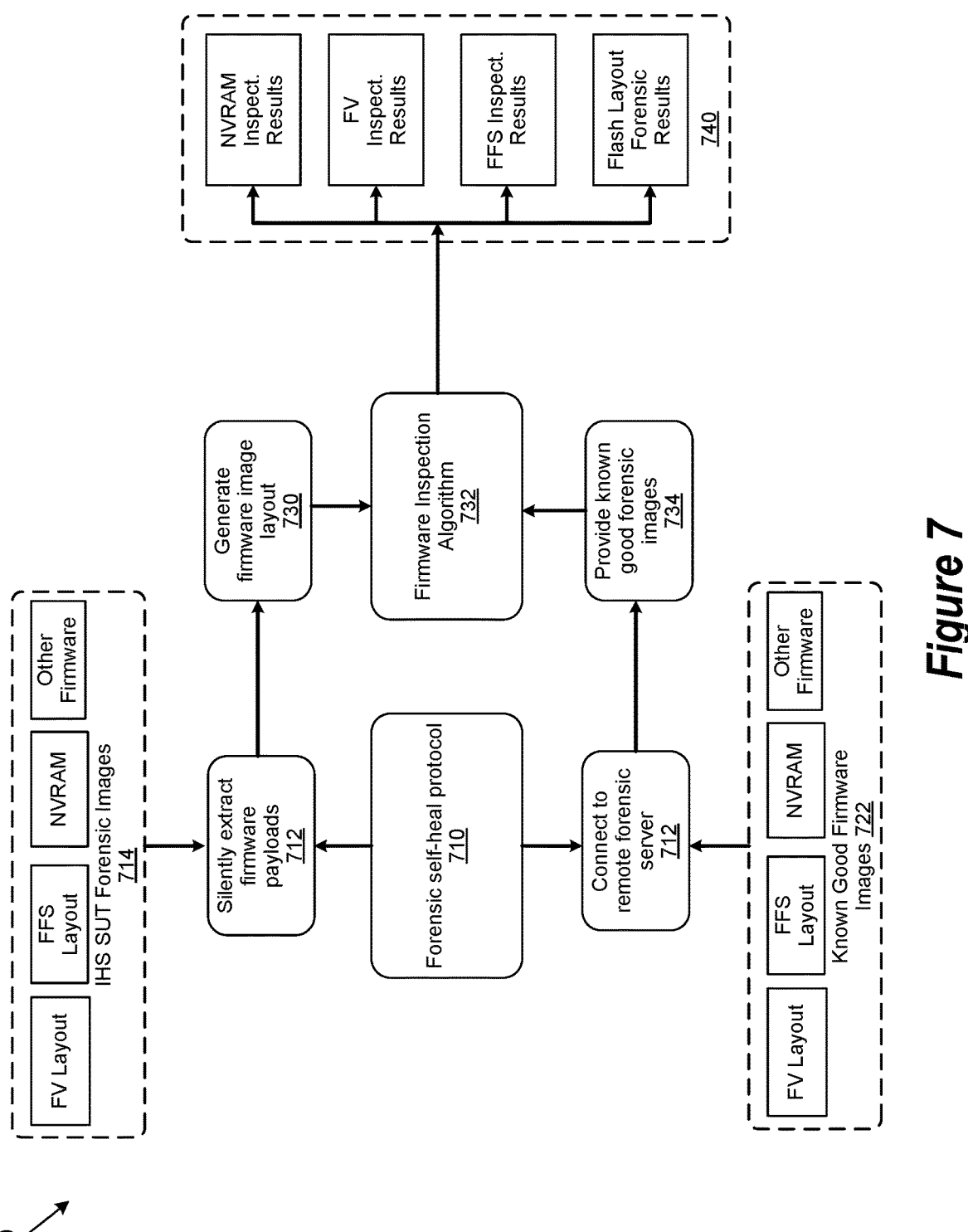

FIG. 7 shows a simplified block diagram showing the performance of processor environment agnostic information handling system firmware forensic vulnerability acceleration operation 700. More specifically, the processor environment agnostic information handling system firmware forensic vulnerability acceleration operation 700 begins operation by using a forensic self-heal protocol 710 to silently extract firmware payloads at step 712 from information handling system under test forensic images 714 and to connect to a remote forensic server at step 720 to retrieve known good firmware images 722. In certain embodiments, the forensic self-heal protocol 710 corresponds to the digital forensic vulnerability acceleration protocol 520.

Next at step 730, a firmware image layout is generated for the firmware payloads 712 from the information handling system and provided to a firmware inspection algorithm 732. Next at step 734, the known good forensic images 722 are provided to the firmware inspection algorithm 732. In certain embodiments, the firmware inspection algorithm 732 corresponds to the digital forensic vulnerability acceleration analysis algorithm 550.

In certain embodiments, the firmware inspection algorithm 732 executes on the information handling system being analyzed. In certain embodiments, the firmware inspection algorithm 732 executes on an offline image. In certain embodiments, the firmware inspection algorithm 732 provides the end to firmware forensic analysis of the firmware. In certain embodiments, the firmware inspection algorithm 732 identifies any sections of the firmware or region of the firmware which are corrupted or have been attacked by a security vulnerability.

In certain embodiments, the firmware inspection algorithm 732 is implemented to execute at different stages of BIOS operation. In certain embodiments, the firmware inspection algorithm 732 initially starts with fewer capabilities during the PEI phase of firmware execution. In certain embodiments, the firmware inspection algorithm 732 functions with more processor environment agnostic vulnerability detection capabilities during a pre-boot DXE phase of execution. In certain embodiments, the firmware inspection algorithm 732 functions with even more processor environment agnostic vulnerability detection capabilities during an operating system runtime phase of execution.

In certain embodiments, the firmware inspection algorithm 732 is applied to a plurality of firmware regions of the firmware image. In certain embodiments, the plurality of firmware regions include a processor reference code firmware region, a memory training firmware region, an open source firmware region, a firmware volume (FV) firmware region, a firmware file system (FFS) firmware region, a non-volatile (NV) memory store firmware region, an embedded controller firmware region, a management engine firmware region, or a combination thereof. In certain embodiments, the firmware inspection algorithm 732 generates one or more remediation inspection results 740. In certain embodiments, the one or more remediation inspection results include NVRAM remediation inspection results, FV remediation inspection results, FFS remediation inspection results, Flash layout remediation inspection results, or a combination thereof.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a firmware management operation, comprising:

identifying a processor environment installed on an information handling system from a plurality of processor environments, each of the plurality of processing environments implementing a respective processor architecture;

extracting a firmware image from the information handling system, the firmware image comprising a plurality of firmware regions, the plurality of firmware regions including a processor reference code firmware region, a memory training firmware region, an open source firmware region, a firmware volume firmware region, a firmware files system firmware region, a non-volatile memory firmware region, an embedded controller firmware region and a management engine firmware region;

retrieving a known good firmware image, the known good firmware image comprising a plurality of known good firmware regions; and, performing a processor environment agnostic information handling system forensic vulnerability acceleration operation, the processor environment agnostic information handling system forensic vulnerability acceleration operation being implemented to function with any of the plurality of processor environments, the processor environment agnostic information handling system forensic vulnerability acceleration operation identifying vulnerable firmware regions for the information handling system from the plurality of firmware regions, the processor environment agnostic information handling system forensic vulnerability acceleration operation being implemented to identify, remediate, or a combination thereof, firmware security vulnerabilities, firmware runtime security vulnerabilities, or a combination thereof, the processor environment agnostic information handling system forensic vulnerability acceleration operation identifying potentially vulnerable firmware regions of the firmware image from the information handling system.

2. The method of claim 1, wherein:

the processor environment agnostic information handling system forensic vulnerability acceleration operation provides a digital forensic vulnerability protocol, the digital forensic vulnerability protocol dynamically learning firmware vulnerabilities, runtime vulnerabilities, or a combination thereof.

3. The method of claim 2, wherein:

the digital forensic vulnerability protocol defines a set of rules for formatting and processing data associated with performance of the processor environment agnostic information handling system firmware forensic vulnerability acceleration operation.

4. The method of claim 1, wherein:

the processor environment agnostic information handling system forensic vulnerability acceleration operation implements a digital forensic vulnerability acceleration algorithm, the digital forensic vulnerability acceleration analysis algorithm comprising a set of commands to perform an operation associated with performance of the processor environment agnostic information handling system firmware forensic vulnerability acceleration operation.

5. The method of claim 4, wherein:

the digital forensic vulnerability acceleration algorithm is implemented at different stages of firmware execution.

6. The method of claim 1, wherein:

the plurality of firmware regions include a processor reference code firmware region, a memory training firmware region, an open source firmware region, a firmware volume (FV) firmware region, a firmware file system (FFS) firmware region, a non-volatile (NV) memory store firmware region, an embedded controller firmware region, a management engine firmware region, or a combination thereof.

7. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

identifying a processor environment installed on an information handling system from a plurality of processor environments, each of the plurality of processing environments implementing a respective processor architecture;

extracting a firmware image from the information handling system, the firmware image comprising a plurality of firmware regions, the plurality of firmware regions including a processor reference code firmware region, a memory training firmware region, an open source firmware region, a firmware volume firmware region, a firmware files system firmware region, a non-volatile memory firmware region, an embedded controller firmware region and a management engine firmware region;

retrieving a known good firmware image, the known good firmware image comprising a plurality of known good firmware regions; and, performing a processor environment agnostic information handling system forensic vulnerability acceleration operation, the processor environment agnostic information handling system forensic vulnerability acceleration operation being implemented to function with any of the plurality of processor environments, the processor environment agnostic information handling system forensic vulnerability acceleration operation identifying vulnerable firmware regions for the information handling system from the plurality of firmware regions, the processor environment agnostic information handling system forensic vulnerability acceleration operation being implemented to identify, remediate, or a combination thereof, firmware security vulnerabilities, firmware runtime security vulnerabilities, or a combination thereof, the processor environment agnostic information handling system forensic vulnerability acceleration operation identifying potentially vulnerable firmware regions of the firmware image from the information handling system.

8. The system of claim 7, wherein:

the processor environment agnostic information handling system forensic vulnerability acceleration operation provides a digital forensic vulnerability protocol, the digital forensic vulnerability protocol dynamically learning firmware vulnerabilities, runtime vulnerabilities, or a combination thereof.

9. The system of claim 8, wherein:

the digital forensic vulnerability protocol defines a set of rules for formatting and processing data associated with performance of the processor environment agnostic information handling system firmware forensic vulnerability acceleration operation.

10. The system of claim 7, wherein:

the processor environment agnostic information handling system forensic vulnerability acceleration operation implements a digital forensic vulnerability acceleration algorithm, the digital forensic vulnerability acceleration analysis algorithm comprising a set of commands to perform an operation associated with performance of the processor environment agnostic information handling system firmware forensic vulnerability acceleration operation.

11. The system of claim 10, wherein:
the digital forensic vulnerability acceleration algorithm is implemented at different stages of firmware execution.

12. The system of claim 7, wherein:
the plurality of firmware regions include a processor reference code firmware region, a memory training firmware region, an open source firmware region, a firmware volume (FV) firmware region, a firmware file system (FFS) firmware region, a non-volatile (NV) memory store firmware region, an embedded controller firmware region, a management engine firmware region, or a combination thereof.

13. A non-transitory, computer-readable storage medium embodying computer program code, the computer program code comprising computer executable instructions configured for:
identifying a processor environment installed on an information handling system from a plurality of processor environments, each of the plurality of processing environments implementing a respective processor architecture;
extracting a firmware image from the information handling system, the firmware image comprising a plurality of firmware regions, the plurality of firmware regions including a processor reference code firmware region, a memory training firmware region, an open source firmware region, a firmware volume firmware region, a firmware files system firmware region, a non-volatile memory firmware region, an embedded controller firmware region and a management engine firmware region;
retrieving a known good firmware image, the known good firmware image comprising a plurality of known good firmware regions; and,
performing a processor environment agnostic information handling system forensic vulnerability acceleration operation, the processor environment agnostic information handling system forensic vulnerability acceleration operation being implemented to function with any of the plurality of processor environments, the processor environment agnostic information handling system forensic vulnerability acceleration operation identifying vulnerable firmware regions for the information handling system from the plurality of firmware regions, the processor environment agnostic information handling system forensic vulnerability acceleration operation being implemented to identify, remediate, or a combination thereof, firmware security vulnerabilities, firmware runtime security vulnerabilities, or a combination thereof, the processor environment agnostic information handling system forensic vulnerability acceleration operation identifying potentially vulnerable firmware regions of the firmware image from the information handling system.

14. The non-transitory, computer-readable storage medium of claim 13, wherein:
the processor environment agnostic information handling system forensic vulnerability acceleration operation provides a digital forensic vulnerability protocol, the digital forensic vulnerability protocol dynamically learning firmware vulnerabilities, runtime vulnerabilities, or a combination thereof.

15. The non-transitory, computer-readable storage medium of claim 14, wherein:
the digital forensic vulnerability protocol defines a set of rules for formatting and processing data associated with performance of the processor environment agnostic information handling system firmware forensic vulnerability acceleration operation.

16. The non-transitory, computer-readable storage medium of claim 13, wherein:
the processor environment agnostic information handling system forensic vulnerability acceleration operation implements a digital forensic vulnerability acceleration algorithm.

17. The non-transitory, computer-readable storage medium of claim 16, wherein:
the digital forensic vulnerability acceleration algorithm is implemented at different stages of firmware execution.

18. The non-transitory, computer-readable storage medium of claim 13, wherein:
the plurality of firmware regions include a processor reference code firmware region, a memory training firmware region, an open source firmware region, a firmware volume (FV) firmware region, a firmware file system (FFS) firmware region, a non-volatile (NV) memory store firmware region, an embedded controller firmware region, a management engine firmware region, or a combination thereof.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *